(12) United States Patent
Wilson

(10) Patent No.: US 7,486,611 B1
(45) Date of Patent: Feb. 3, 2009

(54) STANDBY ROUTER PROTOCOL USING OPTIMAL ROUTE METRIC

(75) Inventor: Ian Herbert Wilson, Midlothian (GB)

(73) Assignee: Cisco Technology, Inc., San Jose, CA (US)

( * ) Notice: Subject to any disclaimer, the term of this patent is extended or adjusted under 35 U.S.C. 154(b) by 978 days.

(21) Appl. No.: 10/151,798

(22) Filed: May 20, 2002

(51) Int. Cl.
*H04L 1/00* (2006.01)
*H04L 12/26* (2006.01)

(52) U.S. Cl. ...................... 370/220; 370/219
(58) Field of Classification Search .......... 370/216–221
See application file for complete search history.

(56) References Cited

U.S. PATENT DOCUMENTS

| | | | | |
|---|---|---|---|---|
| 5,473,599 A | * | 12/1995 | Li et al. | 370/219 |
| 5,519,704 A | * | 5/1996 | Farinacci et al. | 370/402 |
| 6,049,524 A | * | 4/2000 | Fukushima et al. | 370/220 |
| 6,108,300 A | * | 8/2000 | Coile et al. | 370/217 |
| 6,374,362 B1 | * | 4/2002 | Ohtsu | 714/4 |
| 6,393,293 B1 | * | 5/2002 | Saewert et al. | 455/456.1 |
| 6,487,283 B2 | * | 11/2002 | Thomas et al. | 379/112.01 |

OTHER PUBLICATIONS

Network Working Group, RFC 2281 "Cisco Hot Standby Router Protocol (HSRP)," Mar. 1998.

* cited by examiner

*Primary Examiner*—Ronald Abelson
(74) *Attorney, Agent, or Firm*—Weaver Austin Villeneuve & Sampson LLP

(57) ABSTRACT

Redundant gateway methods, apparatus and systems use more than one gateway device in a gateway device group for communications directed outside of a LAN. Failover services in the event that an active router or other gateway device fails. In determining the priority of members of the group to become the active router/device for the group, a route metric is used as the priority value in elections held to determine the operating mode of each group member. This route metric is a numerical value representing the optimality of a route available between the router and a destination such as a remote network. By comparing the members' respective route metrics from time to time and in the event of a trigger event, the active router/device in a group is guaranteed to be the router with the optimal route to that remote network.

39 Claims, 5 Drawing Sheets

HSRP with 4 participating routers in Normal mode

HSRP with 4 participating routers in Failover mode

STANDBY ROUTER PROTOCOL USING OPTIMAL ROUTE METRIC

BACKGROUND OF THE INVENTION

The present invention relates generally to network systems using redundant or standby devices working together in a redundancy group to provide a virtual router service. More particularly, the present invention relates to methods and apparatus for assuring that the physical gateway device responsible for forwarding packets for such a redundancy group (that is, the "active" or primary router or other gateway device) is the gateway device possessing the optimal route to a destination (for example, a remote network).

Local area networks (LANs) are commonly connected with one another through one or more routers so that a host (a PC or other arbitrary LAN entity) on one LAN can communicate with other hosts on different LANs. Typically, the host is able to communicate directly only with the entities on its local LAN segment. When it receives a request to send a data packet to an address that it does not recognize as being local, it communicates through a router (or other layer-3 device) which determines how to direct the packet between the host and the destination address in a remote network. Unfortunately, a router may, for a variety of reasons, become inoperative (e.g., a power failure, rebooting, scheduled maintenance, etc.) creating a trigger event. Such potential router failure has led to the development and use of redundant systems, which have more than one router to provide a back up in the event of primary router failure. When a router fails, the host communicating through the inoperative router may still remain connected to other LANs if it can send packets to another router connected to its LAN.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default" router. In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host cannot send packets outside of its LAN. This may be true even though there may be a redundant router able to take over, because the host does not know about the backup. Unfortunately, such systems have been used in mission critical applications such as stock trading.

The shortcomings of these early systems led to the development and implementation of a hot standby router protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 patent"), entitled STANDBY ROUTER PROTOCOL, issued Dec. 5, 1995 to Cisco Systems, Inc., which is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which is incorporated herein by reference in its entirety for all purposes.

HSRP is widely used to back up primary routers for a network segment. In HSRP, a "standby" or "secondary" router is designated as the back-up to an "active" or "primary" router. The standby router is linked to the network segment or segments serviced by the active router. The active and standby routers share a "virtual IP address" and possibly a "virtual Media Access Control (MAC) address." All internet communication to and from the relevant sub-network employs the virtual IP and MAC addresses. At any given time, the active router is the only router adopting the virtual addresses. Then, if the active router should cease operation for any reason, the standby router immediately takes over its load (by adopting the virtual addresses). This allows the host to always direct data packets to an operational router without monitoring the routers of the network.

A Cisco HSRP system is shown in FIGS. 1-2. As seen in FIG. 1, four gateways 110A-D (for example, routers) operate in a normal mode, providing redundant default gateway services in an active/standby configuration for a common IP subnet. In FIG. 1, the multiple routers 110 (layer-3 switches) form a redundancy group 108 (RG) and share a virtual MAC address 118 and a virtual IP address 116. Hosts 120A-C on a common subnet 130 set their default gateway IP address 126 and MAC address 128 to the virtual addresses 116, 118 within RG 108 for their subnet. In an RG 108 of a prior HSRP system, a "primary" RG member 110A (for example, an "active router") is elected based on pre-configured priorities.

The active router 110A of the RG 108 responds to all address resolution protocol ("ARP") requests for the virtual IP address 116, thus providing default gateway services for all hosts 120 of the common subnet 130 during normal operation. During normal operation, a secondary RG member 110B of the RG 108 remains in a "standby" mode. If the primary member 110A of the RG 108 should fail, as shown in FIG. 2, the standby router 110B will assume the virtual MAC and IP addresses 118, 116, effectively becoming the primary member (or "active router") and thereby providing uninterrupted gateway services to the hosts 120 of common subnet 130 without the need for additional ARP discovery/resolution. This configuration provides a reliable fail-over function for the gateway devices.

As noted above, election to the status of active router in a router group such as the one shown in FIGS. 1 and 2 presently is based on pre-configured priorities in each router. While this is useful and practical in some situations, it does not ensure that the active router for a given group is the router with the best route to a particular destination network. Current networks must rely on ICMP redirects to direct hosts to the router with an optimal route. This is not always possible, or desirable, when a virtual router protocol is used. If ICMP redirects are not possible, then traffic sent to remote networks may traverse the local subnet twice as they are forwarded to the optimal router.

In view of the foregoing, it would be desirable to provide redundant gateway services similar to Cisco's HSRP while ensuring that the active router in a redundant gateway services group is the router with the optimal route to a destination network.

SUMMARY OF THE INVENTION

The present invention relates to redundant gateway protocols using more than one gateway device in a gateway device group for communications directed outside of a LAN. Generally, the invention includes failover services in the event that an active router or other gateway device fails. In determining the priority of members of the group to become the active router/device for the group, a route metric is used as the priority value in elections held to determine the operating mode of each group member. This route metric is a numerical value representing the optimality of a route available between the router and a destination such as a remote network. By comparing the members' respective route metrics from time to time and in the event of a trigger event, the present invention ensures that the active router/device in a group is the router with the optimal route to that remote network.

In one embodiment, a router is configured to operate as a member of an HSRP group. The router's priority field (for example, as defined in RFC 2281) is a route metric representing the optimality of a route available between the router and a destination. In a method embodiment of the present invention, a method of providing redundant gateway services is HSRP implemented by a plurality of routers. Each router calculates a route metric representing the optimality of a route available between that router and a destination (such as a remote network). The route metrics of the routers are used as the priority fields/values for electing active and standby routers in HSRP.

In a different embodiment, a redundancy gateway device operating mode selection system uses a memory and a processor coupled to the memory which are configured to calculate a first gateway device priority value on which the operating mode (for example, one of the states of an HSRP group—active, standby or listen) of a first gateway device in a redundancy gateway group is based at least in part. The first gateway device priority value is determined using a first route metric representing the optimality of a first route available between the first gateway device and a destination. The memory and the processor can be further configured to obtain a second gateway device priority value on which the operating mode of a second gateway device is based at least in part. The second gateway device is in the group and the second gateway device priority value is determined using a second route metric representing the optimality of a second route available between the second gateway device and the destination. The system can compare the first and second gateway device priority values to determine whether the operating mode of the first gateway device should be changed. The memory and the processor can be configured to perform the comparison of the first and second gateway device priority values after the occurrence of a trigger event and/or periodically.

According to another aspect of the present invention, a method for selecting the operating mode of a first gateway device in a redundancy gateway group includes calculating a first gateway device priority value using a route metric representing the optimality of a first route available between the first gateway device and a destination. The group has several gateway devices and each gateway device possesses a priority value on which the operating mode of each gateway device is based at least in part. The method may also include obtaining a second gateway device priority value using a route metric representing the optimality of a second route available between a second gateway device in the group and the destination and comparing the first and second gateway device priority values to determine whether the operating mode of the first gateway device should be changed.

Another aspect of the invention pertains to computer program products including a computer usable medium having computer readable code embodied therein on which is stored computer code (such as program instructions) for implementing at least some portion of the methods described above. Any of the methods of this invention may be represented, in whole or in part, as program instructions that can be provided on such computer readable media. In addition, the invention pertains to various combinations of data and data structures generated and/or used as described herein.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

Definitions

Figure 1:
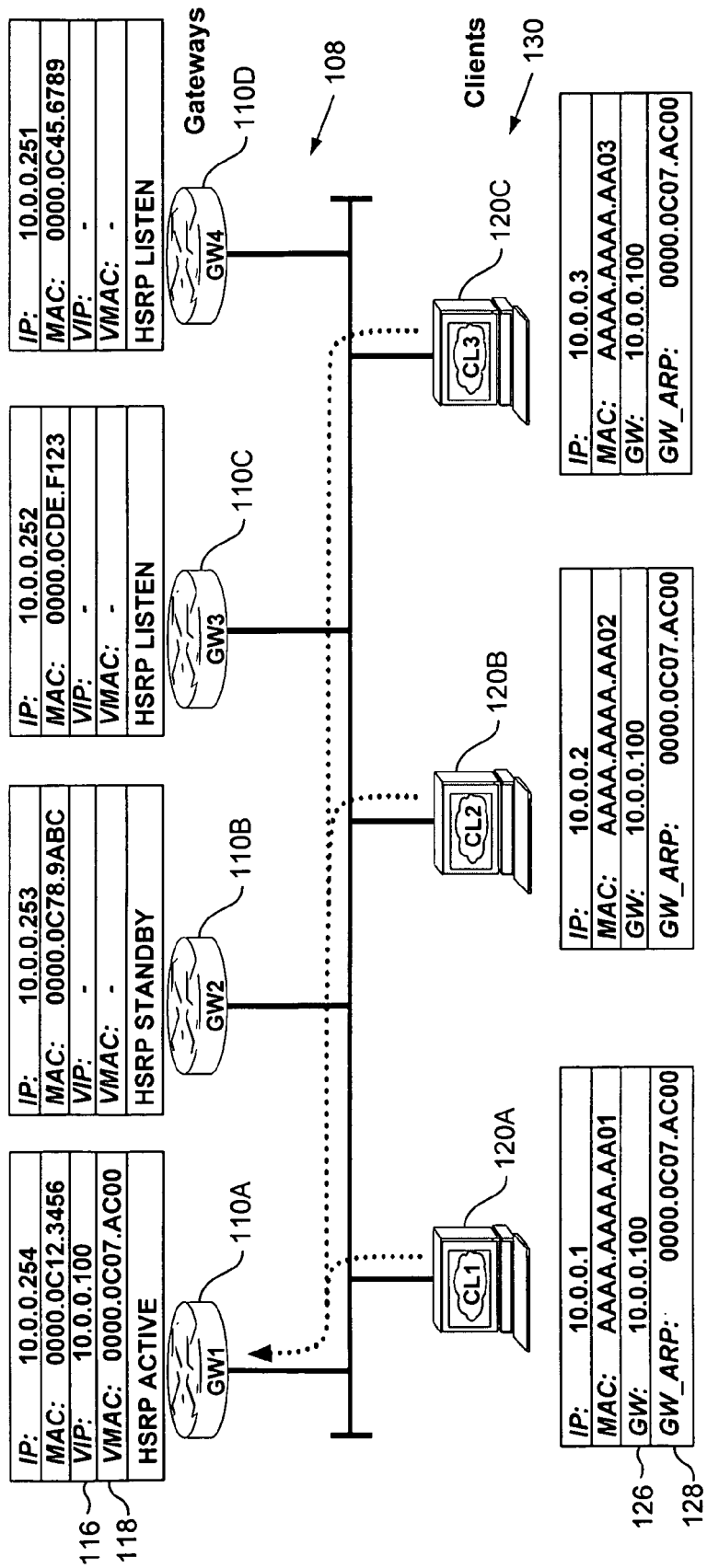
FIG. 1 is a schematic diagram of an HSRP gateway service for hosts in a LAN.
Figure 2:
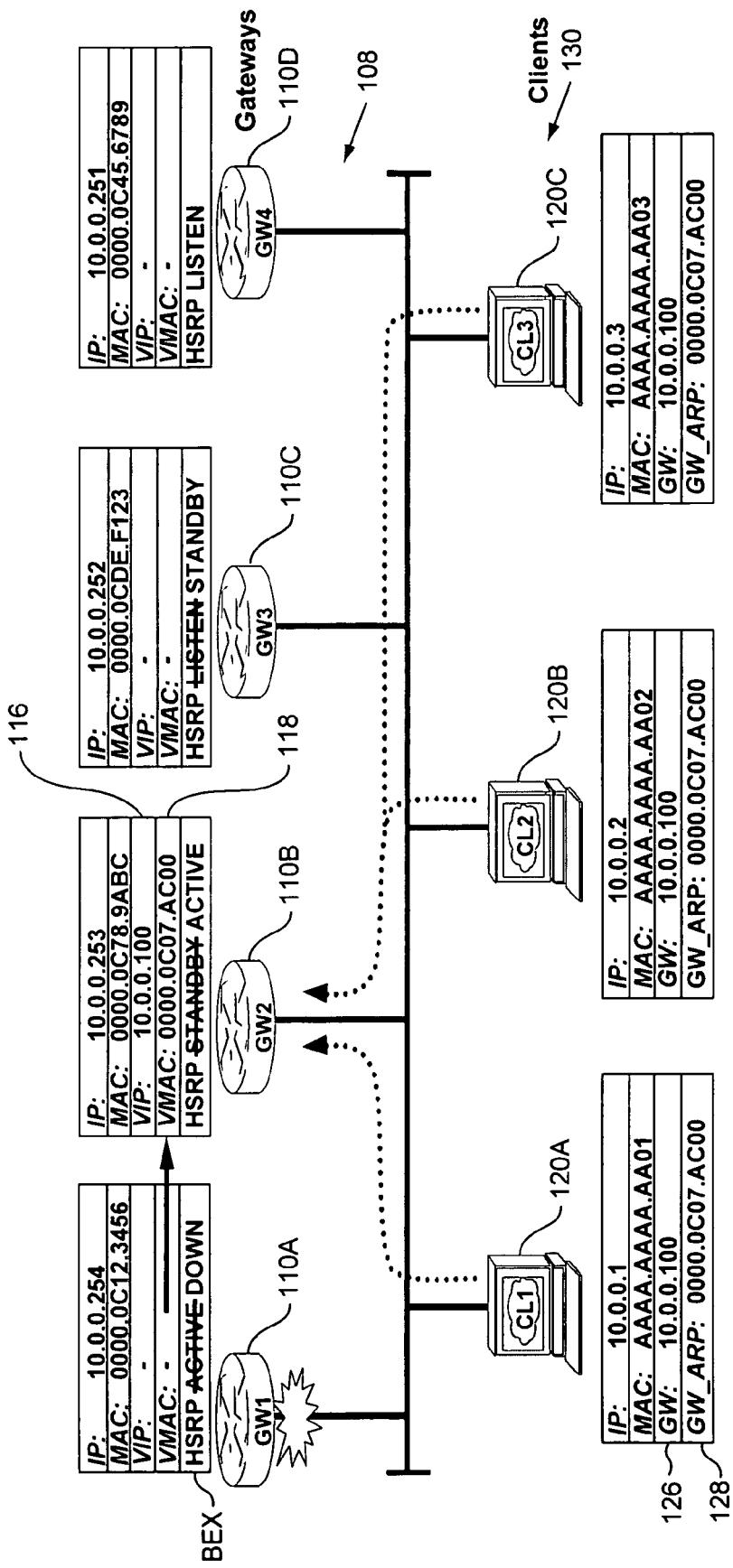
FIG. 2 is a schematic diagram of an HSRP gateway service for hosts in a LAN showing a failover mode when one of the gateway devices fails.

Reference will now be made in detail to the preferred embodiment of the invention. An example of the preferred embodiment utilizing products, protocols, methods, systems and other technology developed, sold and/or used by Cisco Systems is illustrated in the accompanying drawings. While the invention will be described in conjunction with that preferred embodiment, it will be understood that it is not intended to limit the invention to one preferred embodiment or to its implementation solely in connection with Cisco products and systems. On the contrary, the following description is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following terms are used in the instant specification. Their definitions are provided to assist in understanding the preferred embodiments described herein, but do not necessarily limit the scope of the invention.

A "host" is a PC, or other arbitrary network entity residing on a LAN, that periodically communicates with network entities outside the LAN on which the host resides through a router or bridge. The term "user" may be used equivalently in this disclosure.

A "router" is a piece of hardware which operates at the network layer to direct packets between various LANs or WANs of a network. The network layer generally allows pairs of entities in a network to communicate with each other by finding a path through a series of connected nodes. Other terms that may be used in this disclosure include layer 3 switch, layer 3 device and gateway or gateway device which are not necessarily the same as a router, but which may function in the same place and manner as a router. Any and all of these terms are intended to be interpreted as broadly as possible, unless specifically defined more narrowly.

An "IP (internet protocol) address" is a network layer address for a device operating in the IP suite of protocols. The IP address is typically a 32 bit field, at least a portion of which contains information corresponding to its particular network segment. Thus, the IP address of a router may change depending upon its location in a network.

A "MAC address" is an address of a device at the data link layer, defined by the IEEE 802 committee that deals with issues specific to a particular type of LAN. The types of LANs for which MAC addresses are available include token ring, FDDI, and Ethernet. A MAC address is generally intended to apply to a specific physical device no matter where it is plugged into the network. Thus, a MAC address is generally hardcoded into the device—on a router's ROM, for example. This should be distinguished from the case of a network layer address, described above, which changes depending upon where it is plugged into the network. MAC is an acronym for Media Access Control.

A "virtual address" is an address shared by a group of real network entities and corresponding to a virtual entity. In the context of this invention, one real router from among a group of real routers emulates a virtual router by adopting one or more virtual addresses, and another entity (usually a host) is configured to send data packets to such virtual address(es), regardless of which real router is currently emulating the virtual router. In the preferred embodiments, the virtual addresses encompass both MAC layer and network layer (IP) addresses. Usually, various members of the group each have the capability of adopting the virtual address to emulate a virtual entity.

A "packet" is a collection of data and control information including source and destination node addresses, formatted for transmission from one node to another. In the context of this invention, it is important to note that hosts on one LAN send packets to hosts on another LAN through a router or bridge connecting the LANs.

A "remote network" is a network or network segment located outside of the LAN of a host sending a packet.

Overview

Hosts (for example, workstations, users and/or data center servers) using the IP protocol must utilize a default gateway to exit a local network and access remote networks. Therefore, each host must have prior knowledge of the gateway's IP address which typically is a router or layer-3 switch IP address. Hosts are either statically configured with the IP address of the default gateway or are assigned the address through a configuration protocol (such as Cisco's DHCP) upon boot-up. In either case, the host uses the same default gateway IP address for all network traffic destined to exit the local network.

Typically, the election of a standby router and/or active router has taken place after a "trigger event" such as a failure of the active router or the standby router. The term "trigger event" as used herein means an event that has traditionally required changes to a redundancy group and the operating mode(s) of one or more members of such a group, including but not limited to, failure of the active router and failure of the standby router. Such trigger events still require the election of a standby router and/or active router to maintain the proper functioning of the HSRP redundancy group. The election of the active router and standby router previously has been based on pre-configured priorities. That is, each router or gateway device was pre-programmed with a priority (for example, a numerical priority value) that was used in electing an active gateway device or standby gateway device. These static configurations did not allow the redundant gateway protocol to adjust dynamically to changing conditions, other than the failure of the active router and election of a new standby router. In the present invention, the active router or other gateway device is elected based, at least in part, on the device's current relative connectivity to a remote network or other destination outside the gateway's LAN as measured (at least in part) by the device's current route metric to the remote network.

One illustrative embodiment of the present invention uses the route metrics of a group of routers as priority values in electing the active router in an HSRP virtual router group. In Internet communications, a route metric is a value, associated with a route between two locations, which is used to discriminate between multiple exit or entry points to the same autonomous system. Stated another way, a route metric represents the optimality (or cost) of using a given route available between a gateway device (such as a router) and a destination (such as a remote network). The route metric often is represented numerically (for example, in EIGRP or RIP). In some of these routing protocols, the route with the lowest metric is the optimal route and is thus preferred. In the present invention, the router with the optimal route to a remote network is elected to be the active router in the HSRP group. Because the route metric can change over time (for example, bandwidth can become available, delays can increase, etc.), and unlike typical prior HSRP systems, the present invention allows the real router assigned to be the active router to change even when there is no trigger event like the failure of the current active router to compel such a reconfiguration of the virtual router group.

Route metrics may be based on various factors, including (but not limited to) hop count, routing delay, or any other appropriate value(s), depending on the type of routing protocol. Following are examples of protocols and the metrics used therein:

| SAMPLE ROUTING PROTOCOL METRICS | | |
| --- | --- | --- |
| Protocol | Metric | Represents |
| RIP | distance | hop count |
| OSPF | cost | bandwidth |
| EIGRP | delay | cumulative delay |
| EIGRP | bandwidth | minimum bandwidth |

One routing protocol commonly used is Cisco's Enhanced Interior Gateway Routing Protocol (EIGRP), which is a distance-vector interior gateway protocol (IGP). EIGRP uses a combination (vector) of metrics to calculate the route metric for each router. Internetwork delay, bandwidth, reliability, and load can all be factored into the route decision. The weighting factors for each of these metrics can be set as desired. EIGRP then uses these weightings to automatically calculate optimal routes (as numerically represented by the route metrics).

EIGRP can provide a relatively wide range of metrics. Reliability and load, for example, can take on any value between 1 and 255; bandwidth can take on values reflecting speeds from 1,200 bps to 10 gigabits per second, while delay can take on any value from 1 to 2 to the 24th power. Wide metric ranges allow metric setting in internetworks with widely varying performance characteristics. Most importantly, the metric components can be combined in a user-definable algorithm. As a result, network administrators can influence route selection in an intuitive fashion.

EIGRP often uses only the minimum bandwidth on the path to a destination network and the total delay to compute a given route metric. Although other metrics can be configured, these other values may be avoided by some since it their use can cause routing loops in a network. Bandwidth and delay metrics are determined from values configured on the interfaces of routers in the path to the destination network.

Figure 3:
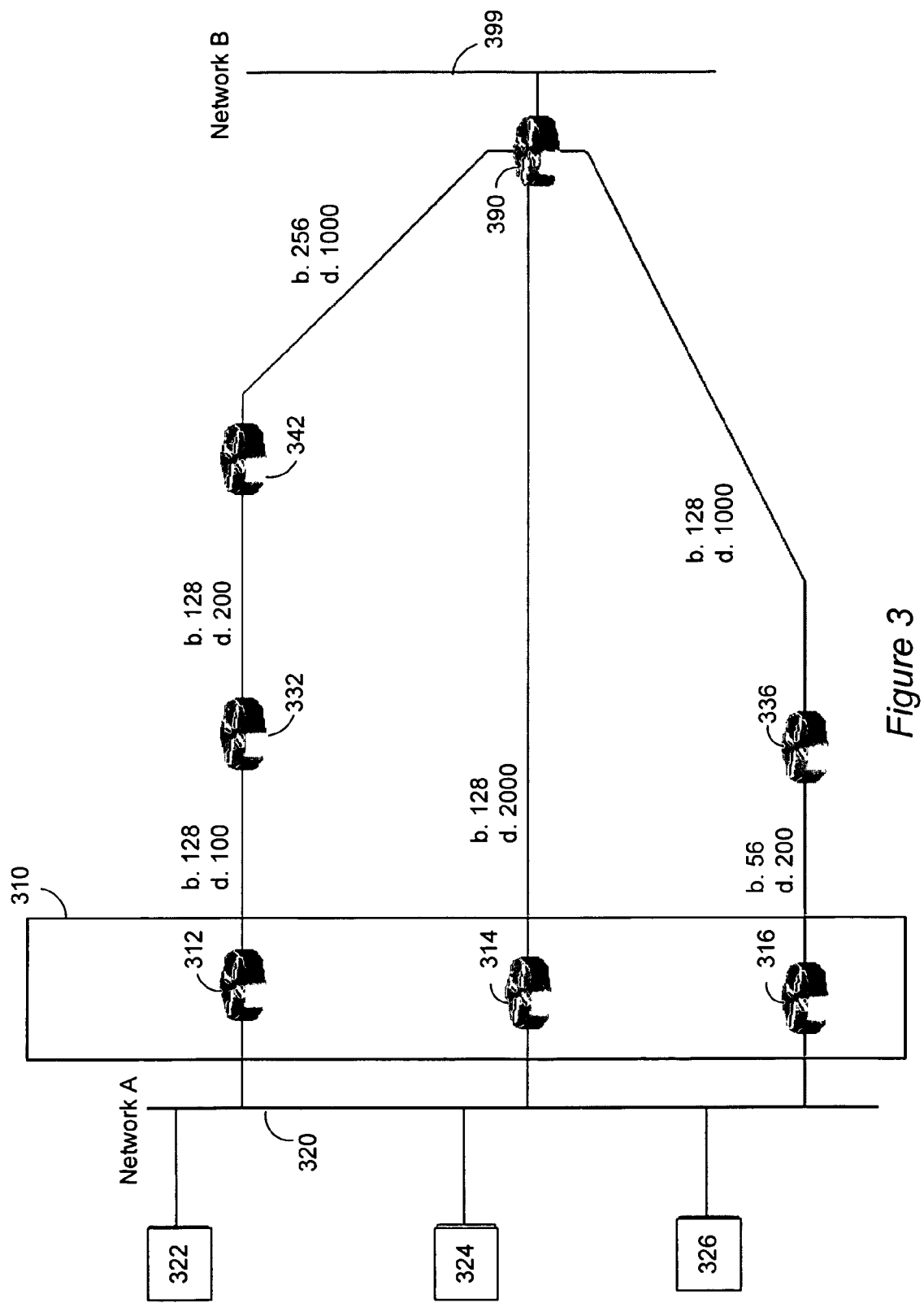
FIG. 3 is a schematic diagram of a virtual router in which several routers are available to direct traffic from Network A to Network B.

For instance, in FIG. 3, a redundancy group of routers 312, 314, 316 function as a virtual router 310. Hosts 322, 324, 326 on Network A 320 use the virtual router 310 as their gateway for communications to remote destinations, including Network B 399. As seen in FIG. 3, each of the routers 312, 314, 316 has a different path to destination 399, encountering different bandwidth limitations and delays. Using a simplified route metric for purposes of illustration, the present invention can be illustrated using the virtual router 310 of FIG. 3.

Each router in group 310 determines the cost of communicating with remote network 399 by calculating a route metric representing the optimality of a route available between each router and the destination, remote network 399. Router 312 evaluates the route through router 332, router 342 and router 390, which has a minimum bandwidth of 128 and a total delay of 1300. Similarly, router 314 evaluates the route through router 390, which has a minimum bandwidth of 128 and a total delay of 2000. Finally, router 316 evaluates the route through router 336 and router 390, which has a minimum bandwidth of 56 and a total delay of 1200.

EIGRP calculates each total metric by scaling the bandwidth and delay metrics using, for example, the following formulas:

bandwidth=(10000000/bandwidth)*256 delay=delay*256

EIGRP then uses these scaled values to determine the total metric to the network, for example using the following:

route metric=[$K1$*bandwidth+($K2$*bandwidth)/(256−load)+$K3$*delay]*[$K5$/(reliability+$K4$)]

The K values typically are determined after careful planning (mismatched K values may prevent a neighbor relationship from being built, which can cause a network to fail to converge). In the present illustration of the invention, the values for K are:

K1=1
K2=0
K3=1
K4=0
K5=0

This simplifies the more complex route metric formula as follows:

route metric=bandwidth+delay

Combining this formula with the scaling factors yields the following expression for the route metric in a simplified EIGRP setting:

$$\left[\left(\frac{10^7}{\text{minimum bandwidth}}\right) + \text{sum of delays}\right] \times 256$$

These formulas assume the delay as configured on the interface, which is in tens of microseconds. In this example, the total cost through each router in the virtual router 310 is:

Route metric for Router 312 minimum bandwidth=128 k total delay=100+200+1000=1300

[(10000000/128)+1300]×256=(78125+1300)× 256=81425×256=20332800

Route metric for Router 314 minimum bandwidth=128k total delay=2000

[(10000000/128)+2000]×256=(78125+2000)× 256=80125×256=20512000

Route metric for Router 316 minimum bandwidth=56k total delay=200+1000=1200

[(10000000/56)+1200]×256=(178571+1200)× 256=179771×256=46021376

So, under the conditions illustrated in FIG. 3, router 312 has the preferred route metric to Network B from Network A.

Other routing protocols can be used and/or accommodated in connection with the present invention, with varying results. In the example shown in FIG. 3, if the routing protocol was the Routing Information Protocol (RIP), its single metric (hop count) route metric would yield a different result. The RIP route metric is 3 for router 312, 1 for router 314, and 2 for router 316. Although RIP was quite useful for routing within small-to moderate-sized, relatively homogeneous internetworks, its limits have been tested by network growth. In particular, RIP's single metric (hop count) does not allow for as much flexibility in the present invention as some other routing protocols such as EIGRP.

Those skilled in the art will appreciate that the selection of a routing protocol for use in a given setting may be influenced by various considerations. Regardless of the routing protocol selected, however, the present invention can be implemented in a virtual router group or other redundancy group by appropriate selection of the route metric to be used, the remote network or other destination upon which the route metric is based, and appropriate programming of the virtual router redundancy group so that the desired performance can be obtained.

In the example shown in FIG. 3, changes to conditions in the network connections can change the status of the virtual router redundancy group priorities. For example, if the available bandwidth between routers 332 and 342 drops from 128 to 56, the route metric for router 312 increases from 20332800 to 46046976, making the route through router 314 more preferable and thus making router 314 the active router for group 310. Using the teaching of this disclosure, those skilled in the art can implement the present invention in current HSRP systems. The pre-configured priority values are replaced with the route metrics of the routing protocol used by the redundancy group.

Figure 4:
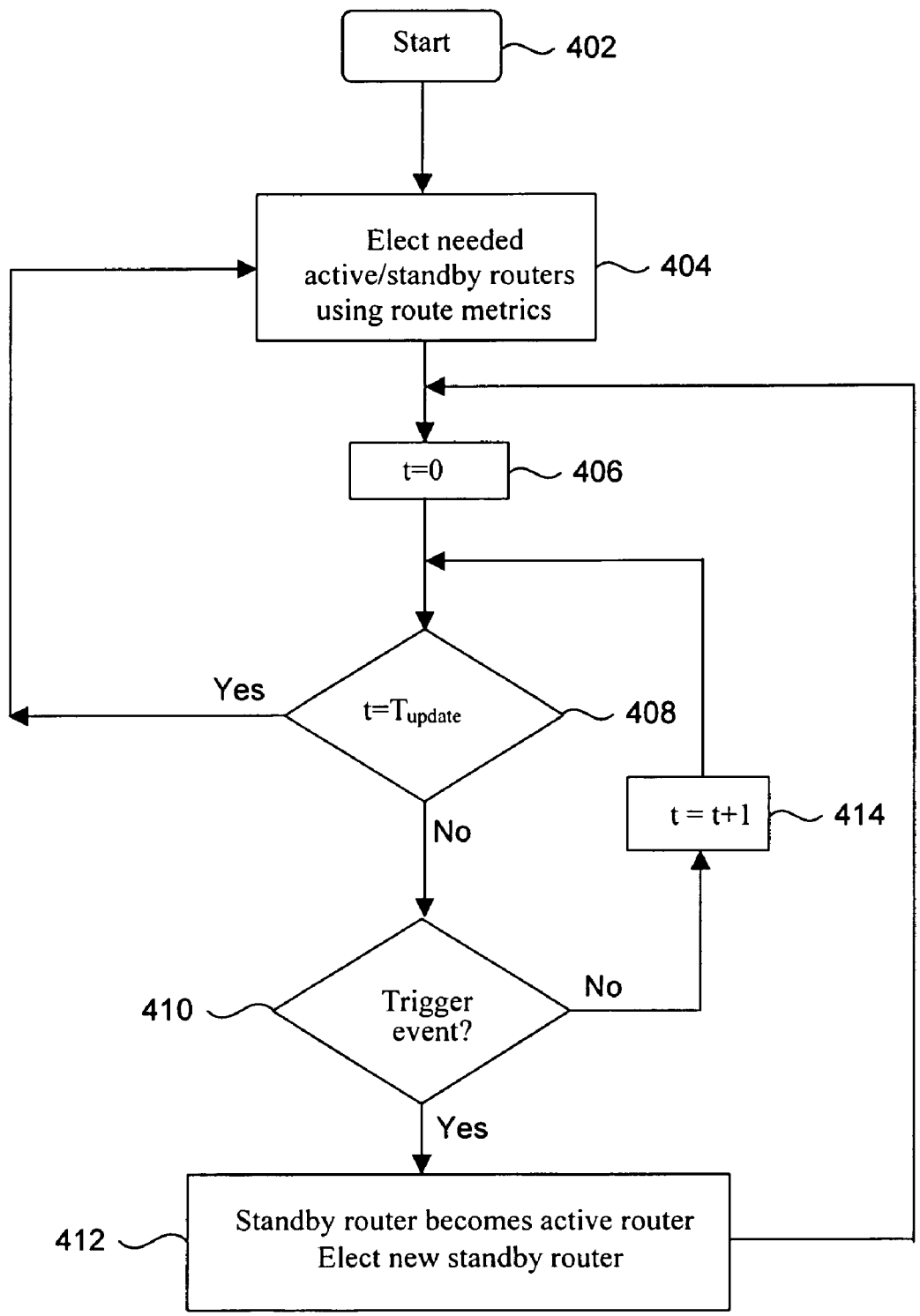
FIG. 4 is a flow diagram showing a methodology using one embodiment of the present invention.

As a further example, FIG. 4 is a flow diagram illustrating one embodiment of the present invention is provided. The flow diagram of FIG. 4 is organized in a manner that could imply that the system checks for certain actions by event loops or polling. No such limitation is intended. Thus, the process flow charts presented herein should not be read to imply that the system necessarily checks for events in the manner and order listed.

In FIG. 4, the redundancy group starts operation 402. An election is held to establish the active and standby routers at 404. A timer starts at 406 and a decision 408 is made as to whether sufficient time has elapsed to re-evaluate the redundancy group configuration. If not, then the system checks for a trigger event at 410. If a trigger event has occurred, then the standby router is promoted to active router at 412 and an election is held to select a new standby router (assuming there is another router in the redundancy group) and route metric re-evaluation clock is restarted at 406. If no trigger event has occurred, then the route metric re-evaluation clock is incremented at 414 and the time decision 408 is checked again. When the predetermined time period $T_{update}$ has transpired, the system evaluates the route metrics of the redundancy group members at 416 to determine whether the operating modes of any of the redundancy group members need to be changed. The route metric re-evaluation clock is then restarted at 406.

As will be apparent to those skilled in the art, the flow diagram of FIG. 4 illustrates only one of a variety of methods for implementing the present invention. RFC 2281, which is incorporated by reference herein, includes a transition table that illustrates operation of HSRP. That transition table is reproduced below as a further example of another methodology in which the present invention can be implemented:

TABLE 1

Events
This table specifies events in an HSRP finite state machine.

| | |
|---|---|
| a | HSRP is configured on an enabled interface. |
| b | HSRP is disabled on an interface or the interface is disabled. |
| c | Active timer expiry. The Active timer was set to the Holdtime when the last Hello message was seen from the active router. |
| d | Standby timer expiry. The Standby timer was set to the Holdtime when the last Hello message was seen from the standby router. |
| e | Hello timer expiry. The periodic timer for sending Hello messages has expired. |
| f | Receipt of a Hello message of higher priority from a router in Speak state. |
| g | Receipt of a Hello message of higher priority from the active router. |
| h | Receipt of a Hello message of lower priority from the active router. |
| i | Receipt of a Resign message from the active router. |
| j | Receipt of a Coup message from a higher priority router. |
| k | Receipt of a Hello message of higher priority from the standby router. |
| l | Receipt of a Hello message of lower priority from the standby router. |

TABLE 2

Actions
This table specifies the actions to be taken as part of the state machine.

A Start Active Timer

If this action occurred as the result of the receipt of a an authenticated Hello message from the active router, the Active timer is set to the Holdtime field in the Hello message. Otherwise the Active timer is set to the current Holdtime value in use by this router. The Active timer is then started.

B Start Standby Timer

If this action occurred as the result of the receipt of an authenticated Hello message from the standby router, the Standby timer is set to the Holdtime field in the Hello message. Otherwise the Standby timer is set to the current hold time value in use by this router. The Standby timer is then started.

C Stop Active Timer

The Active timer is stopped.

D Stop Standby Timer

The Standby timer is stopped.

E Learn Parameters

This action is taken when an authenticated message is received from the active router. If the virtual IP address for this group was not manually configured, the virtual IP address MAY be learned from the message. The router MAY learn Hellotime and Holdtime values from the message.

F Send Hello Message

The router sends a Hello message with its current State, Hellotime and Holdtime.

G Send Coup Message

The router sends a Coup message to inform the active router that there is a higher priority router available.

H Send Resign Message

The router sends a Resign message to allow another router to become the active router.

I Send Gratuitous ARP Message

The router broadcasts an ARP response packet advertising the group's virtual IP address and virtual MAC address. The packet is sent using the virtual MAC address as the source MAC address in the link layer header, as well as within the ARP packet.

TABLE 3

State Transitions

This table describes the state transitions of the state machine. For each event and current state of a router or other gateway device, the device performs the set of actions specified and transition to the designated state. If no action is specified, no action is taken. If no state change is specified, no state change is performed. The notation used in this table has the specified set of actions listed as letters corresponding to the actions listed in Table 2. The next state is listed as a number as specified. A slash ('/') separates actions and states. Certain state transitions have alternatives which depend on external state. Alternatives are separated by a '|'. See the attached notes for details on these transitions.

| | States | | | | | |
|---|---|---|---|---|---|---|
| | 1 Initial | 2 Learn | 3 Listen | 4 Speak | 5 Standby | 6 Active |
| Event | | | | | | |
| a | AB/2 \| 3+ | | | | | |
| b | | CD/1 | CD/1 | CD/1 | CD/1 | CDH/1 |
| c | | | AB/4 | | CDFI/6 | |

TABLE 3-continued

State Transitions

| | | | | |
|---|---|---|---|---|
| d | | B/4 | D/5 | | |
| e | | | F | F | F |
| f | | | B/3 | B/3 | |
| g | EAB/3 | EA | EA | EA | AB/4 |
| h | EAB/3 | A\|BGFI/ 6* | A\|BGFI/ 6* | A\|BGFI/ 6* | G |
| i | | AB/4 | A | CFI/6 | |
| j | | | | | ABH/4 |
| k | | B | B/3 | B/3 | B |
| l | | B/4 | D/5 | | B |

Notes
+If the virtual IP address is configured, set state 3 (Listen) If the virtual IP address is not configured, set state 2 (Learn). In either case do actions A and B.
*If a router/device is configured to preempt do actions B, G, F and I and set state to 6 (Active). If a router/device is not configured to preempt do actions A with no state change.

In the example shown above in connection with Tables 1-3, the priority value used for events such as f, g, h, j, k and l in Table 1 are the route metrics of the respective routers or other gateway devices. This also is true for the priority value referred to in Sections 5.1 and 5.2 of RFC 2281.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 5:
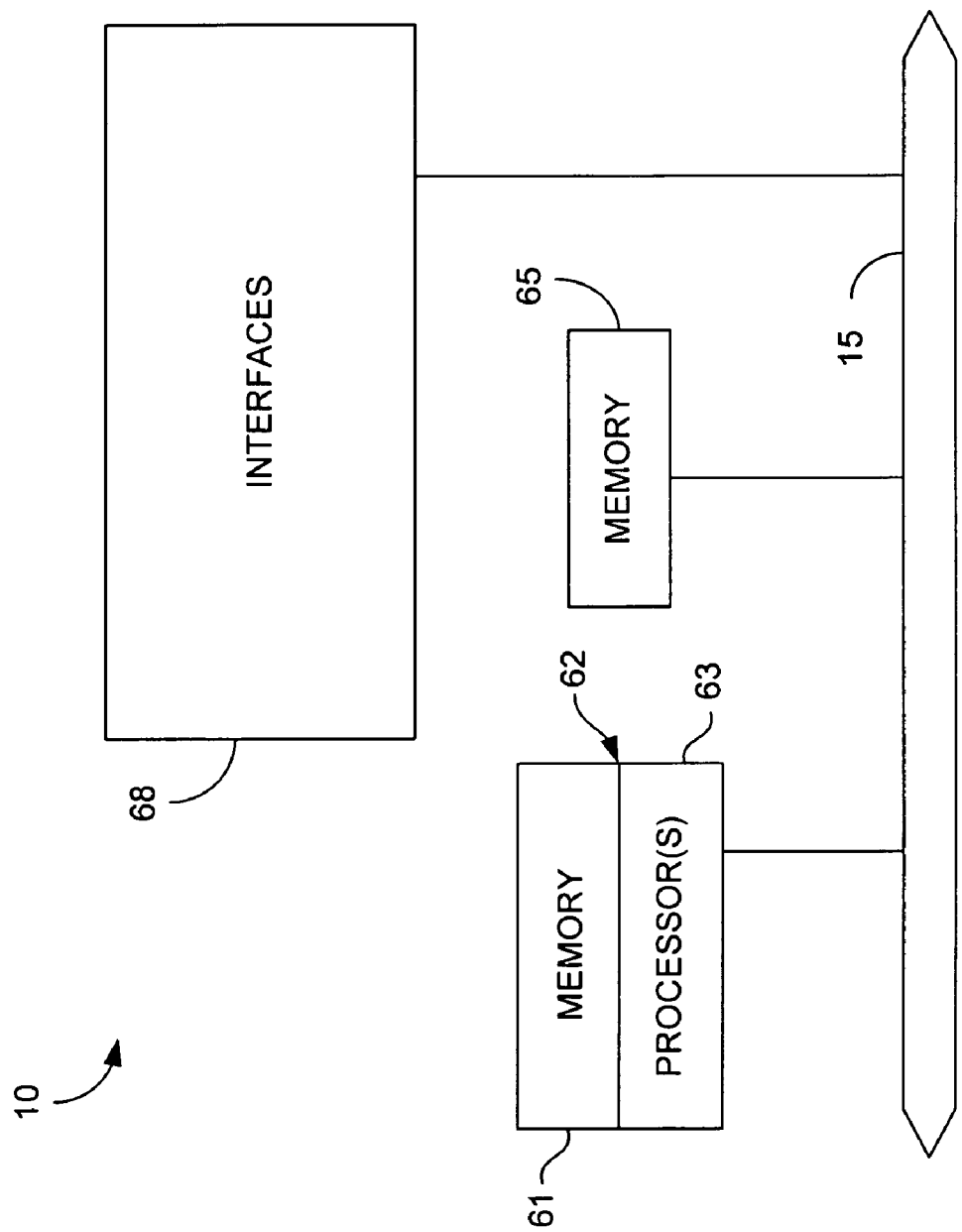
FIG. 5 is a diagrammatic representation of a router in which embodiments of the present invention may be implemented.

Referring now to FIG. 5, a router 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such router tasks as routing table computations and network management. It may also be responsible for calculating a route metric and/or comparing two route metrics to determine which has higher priority. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, one or more Translation Tables, NVI constructs, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A router configured to operate as a member of an HSRP (hot standby router protocol) group which has more than one router to provide a back up in an event of primary router failure, wherein the priority field of the router is a route metric representing the optimality of a route available between the router and a destination, wherein the route metric is used to determine whether to automatically modify an operating mode of the router based upon a comparison of the route metric to route metrics of other routers in the HSRP group, wherein the route metrics of the other routers in the HSRP group represent the optimality of a route available between the corresponding one of the other routers in the HSRP group and the destination.

2. The router as recited in claim 1, wherein the operating mode is standby, active or listen.

3. The router as recited in claim 1, wherein each of the routers in the HSRP group shares a virtual MAC address and a virtual IP address.

4. The router as recited in claim 1, wherein the router is configured to calculate the route metric.

5. A redundancy gateway device operating mode selection system comprising:
   a memory; and
   a processor coupled to the memory;
   wherein the memory and the processor are configured to obtain a first gateway device priority value on which the operating mode of a first gateway device in a redundancy gateway group is based at least in part, the redundancy gateway group having more than one router to provide a back up in an event of primary router failure,
   wherein the first gateway device priority value is determined using a first route metric representing the optimality of a first route available between the first gateway device and a destination;
   obtain a second gateway device priority value on which the operating mode of a second gateway device is based at least in part, wherein the second gateway device is in the group and further wherein the second gateway device priority value is determined using a second route metric representing the optimality of a second route available between the second gateway device and the destination;
   compare the first and second gateway device priority values to determine whether the operating mode of the first gateway device should be changed; and
   automatically change the operating mode of the first gateway device if it is determined that the operating mode of the first gateway device should be changed.

6. The system of claim 5 wherein the operating mode is selected from the following:
   an active state;
   a standby state; and
   a listening state.

7. The system of claim 5 wherein the memory and the processor are configured to automatically perform the comparison of the first and second gateway device priority values after the occurrence of a trigger event.

8. The system of claim 5 wherein the memory and the processor are configured to automatically perform the comparison of the first and second gateway device priority values periodically.

9. The system of claim 8 wherein the memory and the processor are configured to automatically perform the comparison of the first and second gateway device priority values after the occurrence of a trigger event.

10. The system of claim 5 wherein each gateway device is a router.

11. The system of claim 5 wherein the first gateway device calculates the first route metric using a routing protocol used by the first gateway device for determining the cost of using a specific route.

12. The system of claim 11 wherein the routing protocol is EIGRP.

13. The system of claim 5 wherein the first gateway device calculates the first route metric using a routing protocol used by the first gateway device for determining the cost of using a specific route, and further wherein the second gateway device calculates the second route metric using a routing protocol used by the second gateway device for determining the cost of using a specific route.

14. The system of claim 13 wherein the first and second gateway devices use EIGRP as their routing protocols.

15. The system of claim 5 wherein the first gateway device comprises the memory and the processor.

16. A redundancy gateway comprising a plurality of the systems of claim 5.

17. The redundancy gateway device operating mode selection system as recited in claim 5, wherein each router in the redundancy gateway group shares a virtual MAC address and a virtual IP address.

18. A gateway device operating mode selection method for a first gateway device in a redundancy gateway group which has more than one router to provide a back up in an event of primary router failure, wherein the group comprises a plurality of gateway devices and further wherein each gateway device possesses a priority value on which the operating mode of each gateway device is based at least in part, the method comprising the steps of:
   obtaining a first gateway device priority value using a route metric representing the optimality of a first route available between the first gateway device and a destination, wherein the first gateway device priority value is determined using a first route metric representing the optimality of a first route available between the first gateway device and a destination;
   obtaining a second gateway device priority value on which the operating mode of a second gateway device is based at least in part, wherein the second gateway device is in the group and further wherein the second gateway device priority value is determined using a second route metric representing the optimality of a second route available between the second gateway device and the destination;
   comparing the first and second gateway device priority values to determine whether the operating mode of the first gateway device should be changed; and
   automatically changing the operating mode of the first gateway device if it is determined that the operating mode of the first gateway device should be changed.

19. The method of claim 18 wherein the operating mode is selected from the following:
   an active state;
   a standby state; and
   a listening state.

20. The method of claim 18 wherein the step of comparing the first and second gateway device priority values is performed after the occurrence of a trigger event.

21. The method of claim 18 wherein the step of comparing the first and second gateway device priority values is performed periodically.

22. The method of claim 21 wherein the step of comparing the first and second gateway device priority values also is performed after the occurrence of a trigger event.

23. The method of claim 18 wherein each gateway device is a router.

24. The method of claim 18 wherein each gateway device calculates a route metric using a routing protocol used by the gateway device for determining the cost of using a specific route.

25. The method of claim 24 wherein the routing protocol is EIGRP.

26. The gateway device operating mode selection method as recited in claim 18, wherein each gateway device in the redundancy gateway group shares a virtual MAC address and a virtual IP address.

27. A method of providing redundant gateway services comprising HSRP (hot standby router protocol) implemented by a plurality of routers, wherein each of the plurality of routers calculates a route metric representing the optimality of a route available between the router and a destination, and further wherein the route metrics of the plurality of routers are used as the priority values for automatically electing active and standby routers in HSRP in an event of failure of the active router, the method further comprising:
   determining based upon the route metrics whether an operating mode of one or more of the plurality of routers should be changed; and
   automatically changing the operating mode of one or more of the plurality of routers if it is determined that the operating mode of one or more of the plurality of routers should be changed.

28. The method as recited in claim 27, wherein the operating mode is active, standby, or listen.

29. The method of providing redundant gateway services as recited in claim 27, wherein each of the plurality of routers shares a virtual address.

30. A gateway device operating mode selection apparatus for a first gateway device in a redundancy gateway group which has more than one router to provide a back up in an event of primary router failure, wherein the group comprises a plurality of gateway devices and further wherein each gateway device possesses a priority value on which the operating mode of each gateway device is based at least in part, the apparatus comprising:
   means for obtaining a first gateway device priority value using a route metric representing the optimality of a first route available between the first gateway device and a destination, wherein the first gateway device priority value is determined using a first route metric representing the optimality of a first route available between the first gateway device and a destination;
   means for obtaining a second gateway device priority value on which the operating mode of a second gateway device is based at least in part, wherein the second gateway device is in the group and further wherein the second gateway device priority value is determined using a second route metric representing the optimality of a second route available between the second gateway device and the destination;
   means for comparing the first and second gateway device priority values to determine whether the operating mode of the first gateway device should be changed; and
   means for automatically changing the operating mode of the first gateway device if it is determined that the operating mode of the first gateway device should be changed.

31. The apparatus of claim 30 wherein each gateway device is a router.

32. The apparatus of claim 30, wherein each gateway device calculates a route metric using a routing protocol used by the gateway device for determining the cost of using a specific route.

33. The apparatus of claim 32 wherein the routing protocol is EIGRP.

34. A computer program product for implementing a gateway device operating mode selection method for a first gateway device in a redundancy gateway group having more than one router to provide a back up in an event of primary router failure, wherein the group comprises a plurality of gateway devices and further wherein each gateway device possesses a priority value on which the operating mode of each gateway device is based at least in part, the computer program product including a computer usable medium having computer readable code embodied therein, the computer readable code comprising:
   computer code for obtaining a first gateway device priority value using a route metric representing the optimality of a first route available between the first gateway device and a destination, wherein the first gateway device priority value is determined using a first route metric representing the optimality of a first route available between the first gateway device and a destination;
   computer code for obtaining a second gateway device priority value on which the operating mode of a second gateway device is based at least in part, wherein the second gateway device is in the group and further wherein the second gateway device priority value is determined using a second route metric representing the optimality of a second route available between the second gateway device and the destination;
   computer code for comparing the first and second gateway device priority values to determine whether the operating mode of the first gateway device should be changed; and
   computer code for automatically changing the operating mode of the first gateway device if it is determined that the operating mode of the first gateway device should be changed.

35. The computer program product of claim 34 wherein each gateway device is a router.

36. The computer program product of claim 34 wherein each gateway device calculates a route metric using a routing protocol used by the gateway device for determining the cost of using a specific route.

37. The computer program product of claim 36 wherein the routing protocol is EIGRP.

38. A redundancy gateway device operating mode selection system comprising:
   a memory; and
   a processor coupled to the memory;
   wherein the memory and the processor are configured to:
   obtain a gateway device priority value for each gateway device in a redundancy gateway group such that a set of gateway device priority values are obtained, the redundancy gateway group having a set of two or more gateway devices to provide a back up in an event of a failure of an active gateway in the redundancy gateway group, wherein each gateway device priority value is determined using a route metric representing the optimality of a route available between the gateway device and a destination;

determine using the set of gateway device priority values whether an operating mode of one or more of the set of gateway devices should be changed; and automatically change the operating mode of one or more of the set of gateway devices if it is determined that the operating mode of one or more of the set of gateway devices should be changed.

39. The redundancy gateway device operating mode selection system as recited in claim 38, wherein the operating mode is active, standby, or listen.

* * * * *